UNITED STATES PATENT OFFICE.

ALFRED J. HUET, OF PARIS, FRANCE.

EXTRACTION OF ANIMAL FAT FROM SLAUGHTER-HOUSE SCRAPS, &c.

SPECIFICATION forming part of Letters Patent No. 255,863, dated April 4, 1882.

Application filed February 23, 1882. (No specimens.)

*To all whom it may concern:*

Be it known that I, ALFRED JEAN HUET, of Paris, in the Republic of France, have invented a new and useful Improvement in Extraction of Animal Fats from Slaughter-House Scraps and other Refuse, which improvement is fully set forth in the following specification.

This invention relates more particularly to the extraction of animal fats from scraps from slaughter-houses and butchers' tables, and also from offal and miscellaneous refuse.

Heretofore two principal modes of extraction have been used. In small places a simple treatment by direct fire heat has been resorted to, which treatment permits the fat to be obtained by decanting, draining, and pressing, leaving a very rich press-cake as the residuum. This method is extremely simple, since the only apparatus required is a boiler and a press; but it discolors the fat.

The second method (an improvement on the above) substitutes the simultaneous action of water and steam for direct fire heat, whereby the yield is increased, and, as the fat is not liable to discoloration by excess of heat, products of a better quality are obtained; but this method is not adapted to the manufacture of edible fats, which it is more particularly the object of manufacturers at present to obtain.

By the present invention the necessary conditions of this manufacture are secured, and important improvements as well in the extraction of the fats are effected. The excess of heat, which by acting upon the flesh and adipose tissue discolors the fat, gives it a bad taste, and dissipates the fresh odor, (the most important element to retain,) is avoided. All the fatty bodies, edible or industrial, are extracted without fear of causing the decomposition of accompanying bodies, such as takes place with the treatment by water and steam, which treatment requires the intervention at a given time of salt and then of sulphuric acid. Moreover, the plant is considerably simplified, the special apparatus heretofore required for carrying off the liquids is at least in large part discarded, and the causes of insalubrity in these (rendering or extracting) establishments very much lessened.

The following is the mode of treatment in accordance with the invention: Take, say, the fatty remnants of slaughter-houses, which are used mostly for the extraction of edible fats. These are submitted to the action of a machine (hashing-machine) for breaking the sacks or envelopes containing the fatty matters. This has commonly been done heretofore, and the ordinary means are or may be used. The hashed products are then placed in a suitable reservoir with an antiseptic solution of aluminium chloride marking 10° Baumé, and allowed to macerate therein for twenty-four hours. They are then removed and allowed to drain.

Offal and similar refuse are to be cleaned and washed in order to separate foreign matters which would discolor and give a bad taste to the fat, and to be subjected to the action of a drying and pulping machine before maceration in the antiseptic liquor of 10° Baumé, and after maceration for twenty-four hours the pulp is allowed to drain, and is then cold-pressed, so as to remove not only the excess of antiseptic liquor with which it is impregnated, but also a part of the water of constitution which fresh offal contains.

The chloride of aluminium of the antiseptic liquor may be more or less pure, and can be obtained either by acting upon natural rocks or by the use of industrial productions.

The macerating solution for slaughter-house and butchers' scraps can be used again and again by keeping up the strength by means of suitable additions from time to time. With offal and similar refuse it is, on the contrary, necessary to renew it at each operation, seeing that the quantity of the solution at 10° Baumé required to tan foreign matters is also that necessary to the complete impregnation of the pulp. The liquid drained off or expelled by cold pressure may be used to wash the material before hashing, and the very small amount of tanning and antiseptic agent (aluminium chloride) therein be thus utilized. By maceration the matters under treatment are rendered proof against putrefaction, and it is not necessary to proceed to extract the fats within twenty-four hours; but they can be stored and worked up according to the dictates of convenience or economy.

The next step is the extraction of the fat. To let the fat run off more easily a small quantity of straw is mixed with the drained or drained and pressed pulp—say one per cent. for remnants of slaughter-houses and butchers' shops, and two per cent. for offal. Thus prepared the material is spread about fifteen to twenty centimeters thick on an inclined hollow plate which is heated by steam to a temperature not above 100° centigrade, and is pressed by another hollow plate similarly heated. The pressure should be about fifty kilograms per superficial meter. By the combined effect of the heat and pressure the first fat is run off, and is received at the bottom of the plates in molds or in other convenient receptacles. At first only fat is received, but as the temperature of the mass rises the flesh and tissues become more and more tanned, and the water as well as the fat separates. This water, coming to a temperature of 85° centigrade or thereabout, acts upon the tissues, yielding gelatine, and a brown liquor which gelatinizes on cooling runs off with the fat. As soon as it is perceived that the flow of fat has substantially ceased the operation is stopped, and the matter on the hot plate is rapidly removed and introduced into bags and subjected to the action of a hot-press. The final portion of fat and gelatine is then received.

Instead of a hot-press, a centrifugal machine heated by steam can be used.

From the press or centrifugal machine an almost dry cake is removed containing the animal tissue more or less disorganized, mixed with a small quantity of straw, and containing a very small proportion of fat. This cake can be used as food for hogs, or for manure, or, if desired, it can be treated with sulphuric acid to extract the last traces of stearic or margaric acid, as practiced with the residues of oil-works.

It will be seen therefore that in the new treatment constituting this invention the original material is rendered non-putrefactive; that the contact of neither water nor steam is required for the extraction of the fat; that as the temperature of operation does not exceed the boiling-point of water, and as the operations are much simplified, all the changes in the organic matters which infect and discolor the fat are avoided; that the fat of first quality and of first flow is collected; and that, as secondary products are obtained a valuable cake and a merchantable gelatine.

I claim—

The method herein described of extracting animal fats, comprising essentially, first, the treatment with aluminium chloride prepared by acting upon natural rocks, or in other suitable way; and, second, the expression of the fat and gelatine at an elevated temperature by means of hot plates, centrifugal machines, or other suitable apparatus.

In testimony whereof I have signed this specification in the presence of two subscribing witnesses.

ALFRED JEAN HUET.

Witnesses:
ENY DUBUIS,
C. NAILLYTS.